United States Patent [19]

Sugimoto et al.

[11] Patent Number: 4,514,471
[45] Date of Patent: Apr. 30, 1985

[54] PROCESS FOR THE PREPARATION OF ELECTRON BEAM CURING GYPSUM PANEL

[75] Inventors: Kenji Sugimoto, Chigasaki; Osamu Isozaki, Hiratsuka, both of Japan

[73] Assignees: Taisei Corporation, Tokyo; Kansai Paint Co., Ltd., Amagasaki, both of Japan

[21] Appl. No.: 594,434

[22] Filed: Mar. 29, 1984

Related U.S. Application Data

[63] Continuation of Ser. No. 410,844, Aug. 23, 1982, abandoned.

[30] Foreign Application Priority Data

Aug. 26, 1981 [JP] Japan ................... 56-132635

[51] Int. Cl.³ .............................................. B05D 3/06
[52] U.S. Cl. .................................. 428/703; 106/110; 106/111; 156/39; 427/44; 427/54.1
[58] Field of Search ............... 427/44, 54.1; 156/39, 156/41, 45; 428/482, 703; 106/110, 111

[56] References Cited

U.S. PATENT DOCUMENTS

| | | | |
|---|---|---|---|
| 3,770,602 | 11/1973 | D'Alelio | 427/44 |
| 3,773,533 | 11/1973 | Omoto et al. | 156/39 |
| 4,045,416 | 8/1977 | Robson et al. | 427/54.1 |
| 4,057,657 | 11/1977 | Garnett et al. | 427/44 |
| 4,146,402 | 3/1979 | Kira et al. | 106/110 |
| 4,174,230 | 11/1979 | Hashimoto et al. | 106/111 |
| 4,269,869 | 5/1981 | Morohashi et al. | 427/54.1 |
| 4,328,178 | 5/1982 | Kossatz | 106/110 |
| 4,340,521 | 7/1982 | Deleuil | 106/110 |

Primary Examiner—John H. Newsome
Attorney, Agent, or Firm—Cushman, Darby & Cushman

[57] ABSTRACT

Disclosed is a process for the preparation of an electron beam curing gypsum panel which comprises subjecting a hydrated gypsum slurry containing or free of an additive, fibrous material, fine aggregates, water, etc. to defoaming, setting and drying to form a gypsum substrate, coating an electron beam curing resin composition on the surface of the gypsum substrate to form a coated film, and irradiating accelerated electron beam on the coated film thereby to be cured.

7 Claims, 2 Drawing Figures

PROCESS FOR THE PREPARATION OF ELECTRON BEAM CURING GYPSUM PANEL

CROSS-REFERENCE TO RELATED APPLICATION

This application is a continuation of our earlier application Ser. No. 410,844 filed Aug. 23, 1982, now abandoned.

BACKGROUND OF THE INVENTION (1) Field of the Invention

This invention relates to a process for the preparation of an electron beam curing gypsum panel, or more particularly relates to a process for the preparation of an electron beam curing gypsum panel, particularly electron beam curing gypsum tiles, which comprises subjecting a hydrated gypsum slurry containing or free of an additive, fibrous material, fine aggregates etc, to defoaming, setting and drying to form a gypsum substrate, coating an electron beam curing resin composition on the surface of the gypsum substrate to form a coated film, and irradiating accelerated electron beam on the coated film to be cured.

(2) Description of the Prior Art

Gypsum panels have long been known, particularly gypsum tiles have been used for interior decoration in Portugal, and is similar in design to fresco painting which is the art of painting on a lime plaster surface with colors ground in water or a limewater mixture and is applied to the plaster wall.

Many attempts have been made on the process for the preparation of the gypsum tile by use of gypsum, and there have been provided various molded gypsum products such as those obtained by casting a hydrated gypsum slurry into a ceiling or wall and by inserting a stainless steel mesh into a core material on setting for molding to be reinforced; those obtained by transferring a gravure printing to a gypsum slurry reinforced with glass fiber by means of transferring process, drying the slurry, coating for penetration thereon an ultraviolet radiation curing coating composition, and by irradiating thereon ultraviolet light to be cured; a glass fiber-reinforced gypsum board (GRG) made from glass fiber and gypsum slurry; a foamed gypsum board formed by incorporating a cellulose material and glass fiber into a foamed gypsum composition; and the like. As described above, the application and consumption of molded gypsum products are gradually being increased in the field of architecture.

As an example of the coating method of a porous substrate such as an aerated concrete panel for the purpose of coating on the aerated concrete panel, to which waterproof coating is difficult to be applied, to form a completely waterproof coated film thereon, Japanese laid-open patent application No. 17431/1974 discloses a method of coating an aerated concrete panel which comprises coating a curable coating composition onto an inner surface of a mold, to which one face of the concrete panel is slightly recessed, allowing a resulting coating to be half cured, and pressing the surface of the concrete panel to the coating to be cured, the coating composition being transferred onto the concrete panel. Although the Japanese laid-open patent application as above discloses that the curable coating composition is preferably those curable by heating, and may be those curable by the irradiation of ultraviolet light or accelerated electron beam, there is described that the curable coating composition of the latter type of curing is practically difficult to be applied due to the presence of the mold, and further no examples in the aforesaid Japanese patent application refer to the transfer printing process as above by use of ultraviolet radiation or electron beam radiation. The gist of the invention disclosed in Japanese laid-open patent application No. 17431/1974 resides in that the half cured coated film formed on the inner surface of the mold is transferred onto the concrete panel instead of coating a coating composition directly on an aerated concrete panel, and the invention disclosed therein gives no suggestions of preparing gypsum tiles by applying a gypsum substrate formed from a hydrated gypsum slurry having a specified water-gypsum ratio to an electron beam curing coating method according to the present invention.

Japanese laid-open patent application No. 63725/1974 discloses a process for sealing a surface of a porous material such as plastics, FRP, foamed plastics, asbestos fiber material, or fiberboard which comprises applying to the surface a thin film layer of a surface treating agent composed of an ultraviolet radiation curable resin composition, both irradiating ultraviolet light thereon and heating the thin film layer with an intention to seal rapidly and effectively the surface of the porous material. The invention disclosed in the aforesaid Japanese patent application is directed to a process for sealing the surface of the porous material as above, and has a quite different idea from that of the present invention which is directed to a process for preparing a colored tile from a gypsum substrate formed from a hydrated gypsum slurry having a specified water-gypsum ratio. Moreover, the process disclosed in the aforesaid Japanese patent application is quite different from that of the present invention in that a combined application of ultraviolet light and heat is essential to the former process.

Japanese laid-open patent application No. 128927/1974 discloses a method of improving the water resistance of cured gypsum hydrate material which comprises coating a specified ultraviolet radiation curable resin composition on the surface of the gypsum material to be cured. It is an object of the invention disclosed in the aforesaid Japanese patent application to modify a gypsum board, which is liable to absorb water so readily as to be easily degraded mechanical strength, by coating thereon the ultraviolet radiation curable resin, while an object of the present invention is to provide a process for the preparation of an electron beam curing gypsum panel for use in architecture, particularly the pre-finished gypsum tile. Application of an ultraviolet radiation curable resin to the gypsum substrate has such a drawback that the viscosity of the resin becomes higher on coating application compared with the case where an electron beam curing resin is applied. The ultraviolet radiation curing process has many disadvantages compared with the electron beam curing process in that the former process is unsuitable for use in outdoor exposure due to low surface hardness of the cured film and to bad weathering resistance, and that the curable film thickness is small and curing performance is inhibited when an opaque colorant such as pigment is incorporated due to lower penetration of the irradiation energy in the former process. The present inventors made extensive studies in order to overcome the disadvantages of the ultraviolet radiation curing process to find out that the ultraviolet radiation curing process is unsuitable for the preparation of the pre-finished gypsum tile, resulting in developing a novel process for the preparation of an electron beam curing gypsum tile by use of an electron beam curing resin composition.

As electron beam curing gypsum panels have been primarily used as backing substrate, there are some problems to be solved for preparing an electron beam curing gypsum panel. An example of the serious problems to be solved as above is that the adhesive tape of cellophane or cloth base is hardly adhered, or is not adhered at all to the surface of the cured gypsum material when the material contains moisture; even if it is apparently adhered to the surface, there may be only gypsum powder left on adhesive side of the tape after peeling it off, because, microscopically speaking, the surface of the cured gypsum material has such a structure that crystals of gypsum are continuously arranged thereon in a powdered or efflorescence state.

Therefore, when an ultraviolet radiation curable resin composition is coated to be permeated, the cured gypsum material is preheated or the resin is warmed so that permeability of the resin may be increased. In such case, good adhesive properties may be expected if the relationship between the viscosity and depth of permeation of the resin or of the coating composition is controlled. However, there is such a disadvantage that the resin or the coating composition partly remains uncured, because the ultraviolet radiation energy required for curing does not sufficiently reach the deepest part of permeated resin. In order to overcome the aforesaid disadvantage, a combined use of an ultraviolet radiation curable resin and a heat curable resin or an application of multilayer coating, for example, primer coating followed by top coating is needed. There is also such a problem to be solved that a coating composition must be applied to form a transparent film after applying a colored primer coating, because curing step is extremely inhibited when an opaque color pigment is incorporated in the ultraviolet radiation curable resin composition.

The invention disclosed in Japanese laid-open patent application No. 113816/1974 relates to a surface finishing process which comprises coating for penetration a specified monomer-polymer mixture curable by the ionized radiation such as accelerated electron beam on a calcium silicate board, and irradiating thereon said electron beam to be cured. The aforesaid process is in common with the process of the present invention only in the application itself of the electron beam curing step. However, it is an object of the invention disclosed in Japanese laid-open patent application No. 113816/1974 to solve such problems peculiar to the calcium silicate board that the application of a sealer to the calcium silicate board for controlling the extremely high moisture-absorption characteristics and coating permeability of the calcium silicate board results in reduced adhesive properties of the radiation cured coating, as well as difficulties in pre-finishing, while it is an object of the present invention to provide a surface-finished gypsum tile having the physical properties similar to those of the conventional baked tile to be quite different from the aforesaid object of the invention disclosed in Japanese laid-open patent application No. 113816/1974. Moreover, Japanese laid-open patent application No. 113816/1974 suggests nothing about the aforesaid object of the present invention. The present invention is technically different from that of the aforesaid Japanese patent application in that the subject matter of the present invention is directed to a gypsum substrate having a specified water-gypsum ratio, or to a molded substrate formed by adding thereto additives and fibrous materials differently from the calcium silicate board, to which the subject matter of the process of the invention disclosed in the aforesaid Japanese patent application is directed. Moreover, Japanese laid-open patent application No. 113816/1974 suggests nothing about the aforesaid subject matter of the present invention, to say nothing of details of the process of the present invention. Therefore, it is definitely impossible to obtain practically useful electron beam curing gypsum panels, particularly electron beam curing gypsum tiles simply by substituting the steps of the process for the preparation of electron beam curing gypsum panels, particularly gypsum tiles with the surface-finishing method disclosed in the aforesaid Japanese patent application.

Japanese laid-open patent application No. 43410/1973 discloses a process for improving the mechanical strength of a concrete block, in which a liquid potential medium is saturated into the block, then saturated block is cured by heat or by irradiation of ionizing radiation. The process of the invention disclosed in the aforesaid Japanese patent application is fundamentally different from the process of the present invention in that the definition of the medium in the aforesaid Japanese patent application is vague and the chemical composition of the medium is not clear, and in that the medium is saturated into the concrete block at a degree of saturation of from 3 to 25% by weight. Thus, the invention disclosed in Japanese laid-open patent application No. 43410/1973 is definitely different from the present invention in its object, construction as means for achieving the object, and in its effect.

Japanese patent publication No. 35058/1974 discloses a sealing method which comprises impregnating pores of porous rigid objects such as castings and sintered metal parts with a polymerizable anaerobic sealant, for example, a sealant mainly composed of acrylate ester followed by applying thereto a curing treatment. However, the aforesaid Japanese patent apparently suggests nothing about the process for the preparation of gypsum tiles according to the present invention.

The gypsum tile, to which the present invention relates, has such advantages that (1) although it is expanded on setting, its dimensional accuracy is greatly improved in the dry condition when the exothermic reaction has been completed and free water therefrom has evaporated; (2) when white, it has a great adaptability in architectural design, and provides variation in color under illumination, as well as excellent three-dimensional appearance in silhouette; (3) the conventional calcined tile has such a disadvantage that edges thereof are melted by heating to become dull during the unglazed calcination step at 780° C. as well as the glazed calcination step at 1230° C., while the gypsum tile can maintain sharp ridges; (4) it has an excellent acoustic characteristic such as sound insulating and diffusing properties; and that (5) it is non-inflammable. On the other hand, the aforesaid gypsum tile has such disadvantages that (1) the surface hardness thereof is so low that it is easily scratched and contaminated; (2) the impact resistance thereof is so low that sharp edges are easily chipped; (3) it has poor water resistance as well as poor resistance to rainwater and running water; (4) only high-quality α-type hemihydrate gypsum is primarily used, and such inexpensive by-product gypsum as obtained in the desulfurization of exhaust smoke, in the wet process of phosphoric acid manufacturing, or in the fluorine compound manufacturing is not usable, because discoloration due to impurities causes mottlings; (5) it can not be fixed by use of nails and screws; and that (6) it has low creep resistance.

SUMMARY OF THE INVENTION

An object of this invention is to provide a process for the preparation of electron beam curing gypsum panels, particularly electron beam curing gypsum tiles which is capable of providing gypsum panels, particularly gypsum tiles having improved physical properties compared with the conventional gypsum tiles, and having such physical properties as to be compete with those of the conventional baked tiles by use of the aforesaid by-produced α-type hemihydrate gypsum without accompanying disadvantages described above.

Another object of this invention is to provide a process for the preparation of electron beam curing gypsum panels, particularly gypsum tiles which is capable of providing an improved metallic finish and colored finish, particularly a surface finish excellent in decoration and adhesion properties in one coating by the application of the electron beam radiation having a high energy enough to cure the resin film all through the thickness thereof, in which process the addition to the hydrated gypsum slurry of organic additives such as polyvinyl alcohol, polyvinyl pyrrolidone, melamine resin powder, various emulsions and the like prevents the surface of the cured gypsum from powdering, and the migration effect provides a horned surface to form a gypsum substrate suitable for one-coat finish, or inorganic additives such as silica sand, $CaCO_3$ sand, fine aggregates and the like are incorporated into the hydrated gypsum slurry, and an anchor effect due to the penetration of the electron beam curing resin composition into fine gaps between the gypsum and the additive is increased so that adhesive properties of one-coat finish may be made firm and stable, and in which process the electron beam curing resin composition readily penetrable and having low viscosity is coated on the surface of cured gypsum substrate, and the accelerated electron beam is irradiated in such a state that the resin required for surface processing and reinforcement penetrates into the gypsum to be anchored like a root.

This invention provides a process for the preparation of electron beam curing gypsum panels which comprises casting a slurry formed by adding water to α-type hemihydrate gypsum in an amount of from 28 to 60 parts by weight of water per 100 parts by weight of gypsum (hereinafter may be simply referred to as a water-gypsum ratio of from 28 to 60) preferably 35 to 45 parts by weight of water per 100 parts by weight of gypsum to a flat plated mold designed beforehand or to a mold having embossed pattern to a thickness of from 0.4 to 6 mm, preferably about 3 mm directly or after adding thereto at least one selected from an organic additive, inorganic additive and organic or inorganic fibrous material to form a first slurry layer, defoaming said first slurry layer with vibration to be set and dried for forming a first gypsum substrate, or additionally casting on said first slurry layer a slurry having a formulation identical to or different from the aforesaid slurry to a thickness of from 3 to 20 mm, preferably 5 to 15 mm to form a second slurry layer and defoaming said second slurry layer with vibration to be set and dried for forming a second gypsum substrate, coating an electron beam curing resin composition on said first or second gypsum substrate, and irradiating thereon electron beam radiation thereby to be cured.

DETAILED DESCRIPTION OF THE INVENTION

Figure 1:
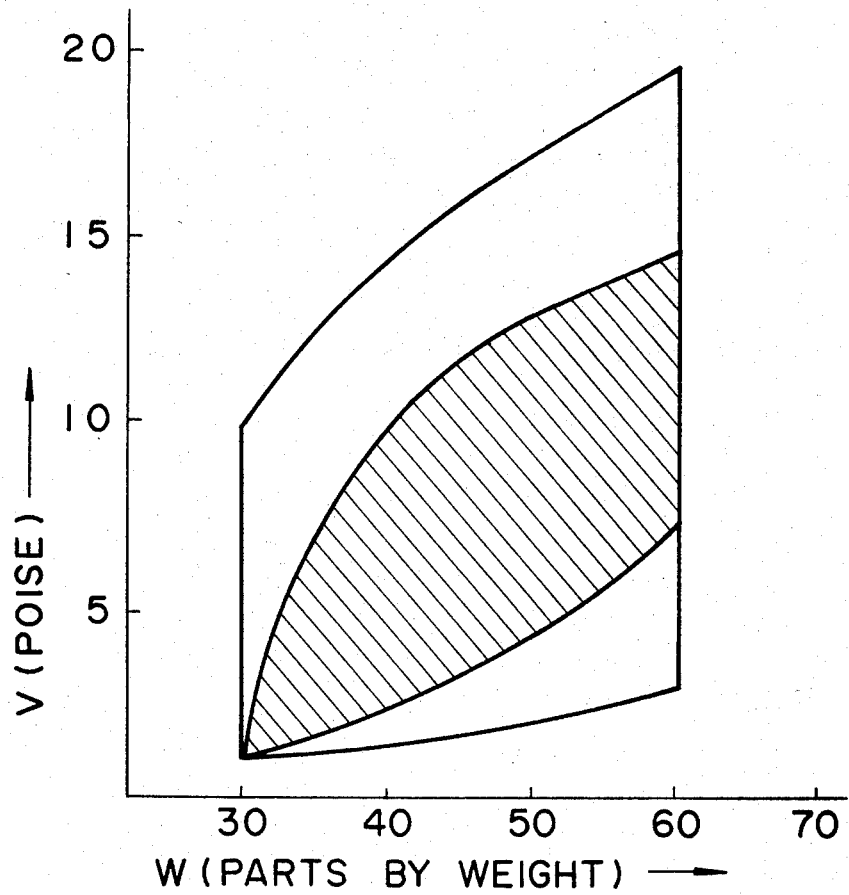
FIG. 1 is a graph showing the relationship between the viscosity V (poise at 25° C.) of an electron beam curing resin or the resin composition and parts by weight of water (W) per 100 parts by weight of gypsum on molding gypsum tiles as an example of finishing schedule of the gypsum tile in the present invention.

A water-gypsum ratio in the process of the present invention is generally in the range of from 28 to 60, particularly of from 35 to 45. When the water-gypsum ratio is above 60, an electron beam curing resin composition penetrates so well into the gypsum substrate to such an extent that no coating remains on the surface of the substrate and that particularly when the ratio is in the neighbourhood of 65, an adhesion test results that the cured coating composition, which has penetrated into the gypsum substrate, provides a bonding power greater than that of the gypsum substrate itself to be stripped off along with the gypsum substrate, and that although the coating composition provides an effective seal, the function thereof as a surface coating is unfavorably deteriorated. When the water-gypsum ratio is less than 28, the expansion coefficient of the gypsum slurry becomes greater to such an extent that designing of the pattern is made difficult, and that the surface of the gypsum substrate becomes so dense that the permeative properties of the electron beam curing resin composition is reduced, and the adhesion properties of cured coating is also reduced.

In the case of the gypsum tile, even if the hydrated gypsum slurry is reinforced with chopped strand E-glass fiber, the water-gypsum ratio is essentially required to be in the range of from 28 to 60 in order to maintain the bending strength of the substrate at a predetermined level. The degree of water absorption of the gypsum substrate molded is generally in the range of from 5 to 12% by weight, preferably from 6 to 10% by weight, and the specific gravity thereof is preferably at least about 1.7.

Thickness of a hydrated gypsum slurry layer prepared by firstly casting to the molding pattern (hereinafter may be referred to as a first slurry layer) is generally in the range of from 0.4 to 6 mm, preferably about 3 mm. When the thickness is less than 0.4 mm, it is disadvantageously made difficult to cast the slurry uniformly to the pattern or to spray uniformly the gypsum slurry directly to the pattern. When the thickness is greater than 6 mm, drawbacks are in that it is difficult to manufacture a product having complicated shape because air is liable to be entrained, or because defoamation becomes difficult.

Although the object of the present invention may be achieved by forming the first slurry layer only, a hydrated slurry having a formulation identical to or different from that in the first slurry layer may be additionally casted thereon to form a second slurry layer with or without vibration. The thickness of the second slurry layer is generally in the range of from 3 to 20 mm, preferably from 5 to 15 mm. When the thickness is less than 3 mm, the second slurry layer unfavorably provides little or no effect by the additional casting of the slurry on the first slurry layer. When more than 20 mm, the weight of the molded material itself becomes too great to be suitably used and bleeding is liable to develop. The weight of the first or second slurry per unit volume on molding is preferably in the range of from about 1,800 to about 2,200 g/l.

The α-type hemihydrate gypsum used in the present invention is represented by a chemical formula of $CaSO_4 \cdot \frac{1}{2}H_2O$, and includes those prepared from natural or synthetic gypsum as the starting material, or those prepared by purifying a gypsum by-produced in the manufacture of phosphoric acid, a gypsum by-produced in the soda-plant, a gypsum by-produced in the preparation of hydrofluoric acid, and the like. Examples of the commercial names of the α-type hemihydrate gypsum thus prepared include phosphoric-gypsum, flue gas gypsum, salt cake-gypsum, active clay-gypsum, hydrofluoric acid-gypsum, titanium-gypsum, ammonium sulfate-gypsum, and the like. The use of a gypsum other than α-type hemihydrate gypsum, for example, β-type hemihydrate gypsum has such disadvantages that, although similar in appearance, the gypsum substrate has so low bending strength as to be liable to cause edge-chippings, cracks, uneven resin penetration into the substrate, etc., and that combination thereof with aggregates is made difficult and working property thereof is poor. However, such disadvantages of β-type hemihydrate gypsum are considerably improved by pressurizing on molding the gypsum slurry.

The molding pattern used for casting and molding the hydrated gypsum slurry in the present invention may be made of, for example, plastics, wood and metal. The plastic pattern may be of, for example, natural or synthetic rubber such as silicone rubber and urethane rubber, polystyrol and the like. The wood pattern may be of a pattern prepared by coating a synthetic resin coating composition thereon, a pattern prepared by applying a melamine plywood thereonto, or the like. The metal pattern (or a mold) may be of aluminium alloy, steel, brass, stainless steel, and the like. These molding patterns may preferably be used in such a manner that the surface thereof is sprayed with water prior to casting the gypsum slurry thereinto, or that they are immersed into water, pulled out thereof and shaked off for use so that the flowability of the gypsum slurry on casting may be improved, and defoaming on molding may be made easy to be particularly advantageous when a pattern of a complicated shape as with many embosses is used. After the completion of casting, the pattern may be cleaned by a water-jet washing.

The organic additives incorporated into the hydrated gypsum slurry in the present invention are selected from the following examples:

(a) Surface hardness modifier:
Synthetic resin emulsion (acrylic copolymer resin emulsion, marketed by Japan Exlan Co. under the trade name of R-108, marketed by Showa High Polymer Co. Ltd. under the trade names of AM-2381 and AM-2388, and marketed by Chuo Rika Kogyo Corporation under the trade name of FK-68 etc.), melamine resin powder, polyvinyl alcohol, polyvinyl pyrrolidone etc., (b) foaming agent:
anionic, cationic and nonionic surface active agents, (c) setting promotor or hardening accelerator:
organic acids and salts thereof, for example, metal salts such as aluminium stearate, which are also effective to improve water resistance of the gypsum substrate, basic organic compounds, soap, and the like, (d) setting retarder or hardening retarder:
polymeric compounds such as gelatin, cracked keratin, casein, γ-globulin, pepsine, starch, tannin, carboxymethyl cellulose and polyethylene glycol; sugar, ethylene-diaminetetraacetate, citric acid, citrates; and hydrophobic inactive substances such as higher fatty acid, paraffin, which is effective to improve water repellency of the gypsum substrate, and the like.

The organic additives are generally incorporated in an amount of from 0.1 to 10 parts by weight per 100 parts by weight of the gypsum in the hydrated gypsum slurry. Particularly, in the case of the synthetic resin emulsion, which is effective to improve the surface hardness of the gypsum substrate, the additive emulsion is incorporated preferably in such an amount that the resin solids is in the range of from 3 to 7 parts by weight per 100 parts by weight of α-type hemihydrate gypsum.

Examples of the inorganic additive include those effective to improve adhesive properties between the gypsum substrate and the electron beam cured resin particularly in one-coat finish such as river sand, sea sand, silica sand, calcium carbonate, marble powder, gypsum ore granules, anhydrous gypsum granules, silica-containing fine glassy aggregates, artificial light weight fine aggregates such as rigid perlite, and the like. The inorganic additive has a particle size preferably of from No. 3 to No. 6 and is incorporated generally in an amount of from 20 to 80 parts by weight per 100 parts by weight of the gypsum in the hydrated gypsum slurry. Of these inorganic granules, the silica sand advantageously has a particle size of about No. 5 to be used and the calcium carbonate advantageously has a particle size of about No. 5 to be used. The incorporation of the aforesaid granular inorganic additive into the gypsum substrate provides the so-called rooting effect to remarkably improve the adhesive properties of the electron beam cured resin to the gypsum substrate in combination with the filling and adhesive effect due to the addition of the sythetic resin emulsion. In addition, examples of the inorganic gypsum setting promotor include finely divided dihydrate gypsum, mineral acid and salts thereof, water glass, and the like. Examples of the setting retarder include borates, alkaline carbonates, and the like. The incorporation of the gypsum ore granules into the hydrated gypsum slurry is effective to promote setting and serves to shorten the release time after casting.

Examples of the organic fibrous material incorporated into the hydrated gypsum slurry in the present invention include wood fibers such as excelsior, pulp, sisal, fibers for plastering and hemp, synthetic fibers such as VINYLON, a modified polyvinyl alcohol fiber, NYLON, a polyamide fiber, polypropylene and polyester fibers and the like, and examples of inorganic fibers incorporated into the hydrated gypsum slurry include metal fibers such as stainless steel and plated steel fibers, glass fibers such as A glass, E glass and alkali resistant glass fibers, SHIRASU fibers (volcanic ash fibers), rock wool fibers, asbestos fibers, carbon fibers, and the like.

The electron beam curing resin composition in the present invention means a film forming resin composition crosslinkable and polymerizable by irradiation of accelerated electron beam, and is based on a resin which is prepared by reacting a base resin having saturated bond to form a skeleton and having a functional group as exemplified in Table 1 with a vinyl monomer having a group capable of effecting addition or condensation reaction with the functional group as exemplified in Table 2 according to the known synthetic procedure, and which is polymerizable and curable by irradiating electron beam energy. Examples of the base resin include at least one selected from acrylic resin, polyester resin, epoxy resin, amino resin such as melamine resin, polyamide resin, polyurethane resin, and the like. Of these resins, the acrylic resin is particularly preferable for outdoor use, and is also preferable for indoor use. Examples of the functional group in the vinyl monomer to be reacted with respective groups contained in the base resin are shown in Table 1. Specific examples of the vinyl monomer having the aforesaid functional groups are shown in Table 2.

If desired, a reactive diluent and/or crosslinkable oligomer may be added to the reaction product between the base resin and the vinyl monomer. Examples of the reactive diluent include styrene, α-methyl styrene, vinyl toluene, acrylic esters, methacrylic esters, acrylonitrile, methacrylonitrile, acrylamide, vinyl acetate, and the like. The crosslinkable oligomer include, for example, any compounds having a molecular weight less than 1,000 and having a polymerizable vinyl group of from 2 to 4. Specific examples of these compounds include diallyl phthalate, ethylene glycol di(metha)acrylate, tetraethylene glycol di(metha)acrylate, bis(ethylene glycol phthalate)-di(metha)acrylate, bis(diethylene glycol phthalate)-di(metha)acrylate, polyethylene glycol-di(metha)acrylate, polypropylene glycoldi(metha)acrylate, trimethylolpropane-tri(metha)acrylate, an addition product between trimethylolethane or trimethylolpropane and an adduct of tolylene diisocyanate with (metha)acrylic hydroxyalkyl ester in a molar ratio of 1:1, pentaerythritol tetra(metha)acrylate and the like. Unsaturated oligomers such as a long-chain ester of (metha)acrylic acid, which have a long-chain alkyl, polyester group etc. as the side chain, may also be used.

The electron beam curing resin is a polymerizable and curable resin prepared by subjecting the aforesaid base resin and the vinyl monomer to addition or condensation reaction so that the amount of the ethylenically unsaturated bonds in the molecule of the reaction product or a degree of unsaturation may be in the range of from 0.3 to 3.0 moles, preferably 0.5 to 2.0 moles per one kg of the molecule, and, if desired, the aforesaid reactive diluent and/or the crosslinkable oligomer may be added in an amount of from 1 to 300 parts by weight, preferably 50 to 150 parts by weight to 100 parts by weight of the reaction product so as to obtain an electron beam curing resin having excellent application properties, curing characteristics and film performances. When the reactive diluent and the crosslinkable oligomer are incorporated concurrently, they may be incorporated at any arbitrary proportions. At least one of the inorganic pigment, organic pigment and metallic pigment, which are conventionally used in the field of the paint and coating technology, may be incorporated into the electron beam curing resin composition having the formulation described above. The electron beam curing resin composition thus prepared is adjusted so as to have a viscosity suitable for coating application, generally in the range of from 0.5 to 20 poise for being coated by the conventional coating method such as brushing, spraying, for example, cold air spraying, hot spraying, airless spraying and electrostatic spraying, flow coating, roller coating, spread coating, or the like. These application techniques may be practiced at any arbitrary batch-type or continuous coating devices. The coating weight per unit area is not specifically limited, but is generally in the range of from 20 to 300 g/m$^2$. The gypsum substrate as a substrate to be coated is the most preferably in the form of a plate, but may be of a three dimensional structure having curved surfaces, uneven portions, etc.

TABLE 1

| Functional groups in the base resin | Monomer Polymerizable vinyl monomer having a functional group reactive with a functional group in the base resin for addition or condensation reaction | |
|---|---|---|
| | functional groups | specific examples of vinyl monomers |
| hydroxyl group | epoxy group | (4) in Table 2 |
| | carboxylic anhydride group | (3) in Table 2 |
| | carboxyl group | (2) in Table 2 |
| | isocyanate group | (7) in Table 2 |
| | methylol group | (5) in Table 2 |
| | alkoxymethylol group | (6) in Table 2 |
| carboxyl group | epoxy group | (4) in Table 2 |
| | hydroxyl group | (1) in Table 2 |
| | isocyanate group | (7) in Table 2 |
| | amino group | (9) in Table 2 |
| | aldehyde group | acrolein, croton aldehyde |
| carboxylic anhydride group | hydroxyl group | (1) in Table 2 |
| | methylol group | (5) in Table 2 |
| | epoxy group | (4) in Table 2 |
| | amino group | (9) in Table 2 |
| epoxy group | hydroxyl group | (1) in Table 2 |
| | carboxyl group | (2) in Table 2 |
| | carboxylic anhydride group | (3) in Table 2 |
| | methylol group | (5) in Table 2 |
| | amino group | (9) in Table 2 |
| | chlorine group | (10) in Table 2 |
| methylol group | hydroxyl group | (1) in Table 2 |
| | isocyanate group | (7) in Table 2 |
| | carboxylic anhydride group | (3) in Table 2 |
| | alkoxymethylol group | (6) in Table 2 |
| | epoxy group | (4) in Table 2 |
| | aldehyde group | acrolein, croton aldehyde |
| | chlorine group | (10) in Table 2 |
| alkoxymethylol group | hydroxyl group | (1) in Table 2 |
| | methylol group | (5) in Table 2 |
| isocyanate group | hydroxyl group | (1) in Table 2 |
| | methylol group | (5) in Table 2 |
| amido group | chlorine group | (10) in Table 2 |
| | aldehyde group | acrolein, croton aldehyde |
| | amido group | (8) in Table 2 |
| amino group | epoxy group | (4) in Table 2 |
| | carboxyl group | (2) in Table 2 |
| | aldehyde group | acrolein, croton aldehyde |
| | carboxylic anhydride group | (3) in Table 2 |
| | chlorine group | (10) in Table 2 |
| chlorine group | epoxy group | (4) in Table 2 |
| | methylol group | (5) in Table 2 |
| | amido group | (8) in Table 2 |
| | amino group | (9) in Table 2 |

Table 2

| Functional group | Vinyl monomers |
|---|---|
| (1) hydroxyl group | hydroxyethyl acrylate hydroxyethyl methacrylate hydroxypropyl acrylate hydroxypropyl methacrylate |

Table 2-continued

| Functional group | Vinyl monomers |
|---|---|
| | allyl alcohol |
| (2) carboxyl group | acrylic acid |
| | methacrylic acid |
| | itaconic acid |
| (3) carboxylic anhydride group | maleic anhydride |
| | itaconic anhydride |
| (4) epoxy group | glycidyl acrylate |
| | glycidyl methacrylate |
| | aryl glycidyl ether |
| (5) methylol group | methylol acrylamide |
| (6) alkoxymethylol group | alkyl (methyl, ethyl, isopropyl, butyl and amyl) etherified compounds of methylol acrylamide |
| (7) isocyanate group | cyanoacrylate |
| | adduct of hydroxyl group-containing vinyl monomer with diisocyanate compound in a molar ratio of 1:1 such as an adduct of one mole of hydroxyethyl methacrylate with one mole of tolylene diisocyanate |
| (8) amido group | acryl amide |
| | methacrylamide |
| (9) amino group | aminoalkyl methacrylate |
| | aminoalkyl acrylate |
| (10) chlorine group | acrylic chloride |
| | methacrylic chloride |
| | vinyl chloride |
| | vinylidene chloride |
| | hydrochloric acid adduct with epoxy group of glycidyl acrylate and glycidyl methacrylate |

In the case where the aforesaid electron beam curing resin composition is coated on the surface of the gypsum panels such as the gypsum tiles prepared by subjecting to setting and drying after molding, and the accelerated electron beam is irradiated onto the surface thus coated, the electron beam accelerator to be used may be of Cockcroft type, Cockcroft-Walton type, insulated core transformer type, dynamitron type, linear filament type or high frequency type. The accelerated electron beam radiated from the electron beam accelerator and having an accelerated energy of from 50 to 1,000 KeV preferably 100 to 700 KeV serves to effect the polymerization and curing of the resin. The electron beam accelerator recited above may be either of the scanning type or curtain beam type. After coating the resin composition, the coated surface is preferably covered with a plastics film such as polyethylene, polyethylene terephthalate, TEFLON, silicone resin treated paper and the like to effect irradiation under the conditions of an irradiation dose of from 0.1 to 30 MR, preferably 0.5 to 10 MR and an irradiation distance of from 3 to 50 cm in an oxygen-free atmosphere. Air in the irradiation chamber may be replaced by an inert gas such as nitrogen, carbon dioxide, helium, combustion gas and the like instead of using the aforesaid plastics film. The covering of the coated surface with the plastics film and replacement by the inert gas may concurrently be applied. Materials readily strippable from the cured resin surface after the completion of irradiation may be selected for the aforesaid plastics film.

Irradiation needs such an accelerating voltage as to allow the electron beam radiation to penetrate all through the total thickness of the coated resin composition and the plastics film. A guideline of the accelerating voltage is such that the accelerating voltage is required to be 100 kV when the total thickness is less than 100 microns, 300 kV when from 100 to 300 microns, and 500 kV when from 300 to 500 microns respectively.

FIG. 1 shows an embodiment of the finishing schedule in the case where the gypsum tile as the representative example of the gypsum panels in the present invention is selected to be used as a substrate for coating. FIG. 1 is a graph showing the relationship between the application viscosity of the electron beam curing resin or the resin composition and the water-gypsum ratio on molding the gypsum tile, wherein the area closed by lines shows the practically available application conditions, and particularly the portion occupied by oblique lines shows preferable conditions.

The casting procedures for molding of the gypsum panels, particularly the gypsum tiles in the present invention will be explained hereinbelow. In the case of the preparation of the gypsum tiles, when the pattern has an emboss deeper than 1.5 mm, air is entrained on casting the hydrated gypsum slurry, and subsequent setting and drying causes enlarging fine pinholes present in the molded gypsum, particularly on the surface thereof to form crater-like recesses in the film of electron beam curing resin or the resin composition. Defoamation of the slurry to be cast including a mixer by use of a vacuum pump produces no enlarged pinholes as above. However, in the case where the gypsum tiles are produced by the application of the continuous belt conveyer production system, the batchwise defoamation process by use of the vacuum pump is not applicable from the standpoint of production efficiency.

The hydrated gypsum slurry is cast in such an amount that the thickness of the slurry cast into the pattern is in the range of from 0.4 to 6 mm, preferably about 3 mm, and is subjected to defoamation by applying a vibration of from 5,000 to 15,000 V.P.M for a period of from 0.1 to 60 seconds on the conveyer with excellent defoamation in the cross sectional direction of the slurry. It is preferred, if required, that the amount to be added of the additives incorporated into the skin layer thus formed such as a migrating agent, for example, various emulsions, melamine resin powder and the like, water-reducing agent, which is capable of reducing the water content for the preparation of the gypsum slurry, and is selected, for example, from an anionic or cationic surface active agent, and fibrous materials is controlled. Incorporation of fibrous materials, for example, chopped strand E-glass fiber in an amount of from 0.3 to 1.0 part by weight per 100 parts by weight of α-type hemihydrate gypsum is effective to provide the hydrated gypsum slurry with thixotropic properties and serves to improve workability on casting. Incorporation of the aforesaid granular inorganic additives, for example, silica sand into the hydrated gypsum slurry serves to satisfactorily overcome such a disadvantage as to be sticky on casting for improving workability in casting, and also serves to make easy levelling of the bottom side on molding.

The water-gypsum ratio of the hydrated gypsum slurry for the skin layer (first slurry layer) is specified according to the present invention. Materials usable for the backing layer (second slurry layer), however, may include β-type hemihydrate gypsum, a slurry capable of additional bottom side casting, panels and fiber sheets.

The gypsum substrate thus set and dried may be immersed in an aqueous oxalic acid solution having a concentration of about 10 % by weight at room temperature for a period of from 30 minutes to 2 hours and is pulled out for drying with such advantages that the surface texture of the substrate are suitably modified due to an etching effect of the aforesaid acid to further improve the film adhesion of the electron beam curing resin composition and to prevent the surface of the substrate from efflorescence.

The present invention has such an advantage that the use of the electron beam curing resin instead of ultraviolet radiation curable resin generally reduces the resin viscosity to such an extent that heating is unnecessary.

According to the present invention, a gypsum substrate, which is prepared by subjecting a hydrated gypsum slurry formed by use of α-type hemihydrate gypsum and having a specified water-gypsum ratio or a slurry formed by further incorporating thereinto various additives, followed by defoaming, molding, setting and drying, is coated with the electron beam curing resin composition followed by irradiation of the accelerated electron beam for curing with such advantages that the cured film has high surface hardness, excellent adhesive properties and weathering properties, and that high irradiation energy used for curing provides increased penetrating power into the coated film so that the opaque color finishing such as colored metallic coating, in which curing is impossible or very difficult with ultraviolet irradiation, may be made possible.

As described above, the practice of the present invention permits the preparation of the electron beam curing gypsum panels with excellent design and decorative effect, highly improved durability competing with the baked tiles and decorative effect unobtainable by use of the calcined tiles.

The present invention will be explained more in details by the following examples. Part and % for the numerical values in the formulations are all part by weight and % by weight respectively.

EXAMPLE 1

A two-pack type silicone resin solution for use in the molding pattern is cast into an 150×150×9 mm Italian tile having an embossed pattern and is left to stand for three days to obtain a silicone rubber pattern. A hydrated gypsum slurry having the following formulation is cast as a first layer to the pattern for obtaining a thickness of 3 mm, and is then subjected to defoamation applying a table vibrator for 5 seconds. A hydrated gypsum slurry having the same formulation as that of the first layer is cast pouring thereover as a second layer to a thickness of about 6 mm, and the surface of the slurry layer is smoothed with trowel for finishing.

| Formulation of the gypsum slurry | |
|---|---|
| α-type hemihydrate gypsum | 100.0 parts |
| water | 42.0 |
| chopped strand E-glass fiber (about 6 mm in length) | 0.3 |
| melamine resin powder | 3.0 |
| 10% aqueous sodium citrate solution | 0.1 |
| calcium carbonate | 20.0 |
| total | 165.4 parts |

The resulting gypsum slurry is left to stand for setting, released, and dried in an electric oven at 60° C. for 12 hours to obtain a gypsum substrate.

A color pigment composed of 4 parts of yellow iron oxide and one part of red iron oxide is dispersed into 100 parts of the electron beam curing resin composition (solution) having the following preparation formula to form an orange colored electron beam curing coating composition according to the conventional dispersing procedure. The coating composition has a viscosity of 5 poise at 25° C.

Preparation of electron beam curing resin composition (solution)

A copolymer having a number average molecular weight of about 15,000 and composed of 400 parts of methyl methacrylate, 458 parts of ethyl acrylate and 142 parts of glycidyl methacrylate is reacted for esterification with 72 parts of acrylic acid to obtain an unsaturated acrylic resin having a degree of unsaturation of 0.93 mole/kg of molecule. The unsaturated acrylic resin is mixed with 1,072 parts of 1,6-hexanediol diacrylate and 128 parts of trimethylolpropane triacrylate to form an electron beam curing resin solution.

The aforesaid electron beam curing coating composition is coated on the surface of the gypsum substrate by airless spraying to a coating weight of about 100 g/m² (equivalent to a film thickness of about 100 microns), the coated surface is then covered with a polyethylene terephthalate film having a thickness of 80 microns, and the accelerated electron beam is irradiated thereonto for curing. A scanning type electron beam accelerater is used under the conditions of an accelerating voltage of 300 kV, a distance between the irradiation source and the coated surface of 10 cm and an irradiation dose of 5 MR.

Finished gypsum tile thus obtained has a surface with beautiful, orange, high gloss finishing, a surface hardness (pencil hardness) of 6H, and excellent durability for outdoor use. The application of a number of the surface-finished gypsum tiles to a building wall surface permits to form a color matrix clearer than the conventional calcined tiles.

EXAMPLE 2

A vinyl chloride resin pack having a thickness of 0.3 mm is molded by heating to form a 45×600×15 mm panel pattern having commercial slab chocolate-like uneven appearance. A hydrated gypsum slurry having the following formulation is cast as a first layer into the pattern thus formed to a thickness of about 5 mm, and is then subjected to defoaming by applying a table vibrator for 3 seconds. A hydrated gypsum slurry for a second layer is cast thereover to a thickness of about 10 mm followed by applying the vibrator for 5 seconds. Thus, a bottom side of the substrate with a required size accuracy is formed, and the bottom surface thereof is smoothed with a comb-like flat trowel for bottom side finishing.

| Formulation of the gypsum slurry | for the first layer | for the second layer |
|---|---|---|
| α-type hemihydrate gypsum | 100 parts | 100 parts |
| water | 55 | 60 |
| pulp fiber | 2 | 3 |
| acrylic resin emulsion | 3 | 3 |
| KANSUI stone sand (Japanese white marble sand) (particle size less than 1 mm) | 20 | — |
| total | 180 parts | 166 parts |

The gypsum slurry cast as above is left to stand for setting, is released, and is dried in an electric oven at 60° C. for 12 hours to obtain a gypsum substrate.

A colored metallic coating composition (metallic blue) is prepared according to a formulation shown below containing an electron beam curing resin composition (solution) having the following preparation formula. The coating composition has a viscosity of 3 poise at 25° C.

Preparation of electron beam curing resin composition (solution)

444 parts of isophorone diisocyanate is reacted with 1,000 parts of polycaprolactone having a molecular weight of about 1,000 (marketed by Daicel Chemical Industries, Ltd. under a trade name of PLACCEL) through an addition reaction of urethane linkage formation, then 232 parts of 2-hydroxyethyl acrylate is reacted therewith to obtain an unsaturated resin having a molecular weight of about 1,700 and a degree of unsaturation of 1.2 moles/kg of molecule. 1,000 parts of the unsaturated resin is mixed with 550 parts of neopentylglycol dimethacrylate to form an electron beam curing resin solution.

| Formulation of colored metallic coating composition | |
|---|---|
| | Parts |
| electron beam curing resin solution as above | 100 |
| phthalocyanine blue | 5 |
| aluminium paste (average particle size: about 25 microns) | 3 |
| total | 108 parts |

The colored metallic coating composition as above is coated on the surface of the gypsum substrate by air spraying to a coating weight of about 50 g/m$^2$ (equivalent to a film thickness of about 50 microns), and the coated article is then subjected to irradiation of accelerated electron beam in an atmosphere of a combustion gas for curing. The electron beam accelerator is of a curtain-beam type and applied under the conditions of an accelerating voltage of 100 kV, a distance between the irradiation source and the coated surface of 10 cm, and an irradiation dose of 2 MR.

Finished gypsum tile thus obtained has a surface with a beautiful blue metallic coating, a surface hardness of 4H, and excellent durability for outdoor use, and provides a good decorative effect due to peculiar metallic appearance unobtainable with the conventional calcined tiles as the wall surface structure.

EXAMPLE 3

Figure 2:
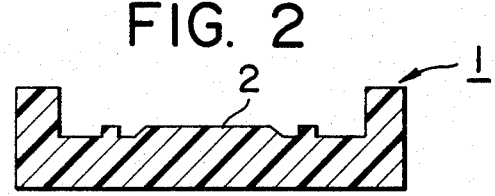
FIG. 2 is a cross-sectional view showing an example of the pattern with which a hydrated gypsum slurry is subjected to molding according to the present invention, wherein 1 represents a pattern and 2 represents a kick.

A hydrated gypsum slurry having the following formulation as a first layer is sprayed with a mortar gun into a 30 cm square of urethane rubber pattern having a convex surface in the center as shown in FIG. 2 to a thickness of 2 mm, then a table vibrator is applied thereto for 5 seconds. Further, a hydrated gypsum slurry for a second layer is cast to a thickness of about 12 mm.

| Formulation of the gypsum slurry | | |
|---|---|---|
| | for the first layer | for the second layer |
| α-type hemihydrate gypsum | 100 parts | 100 parts |
| water | 37 | 40 |
| No. 5 silica sand | 45 | 50 |
| melamine resin powder | 2 | 1 |
| SHIRASU (volcanic ash) short fiber (about 6 mm in length) | 0.2 | 0.4 |
| total | 184.2 parts | 191.4 parts |

The molded gypsum slurry thus obtained is cured under the same conditions as in Example 1 to obtain a gypsum substrate.

A colored pigment composed of 10 parts of rutile titanium oxide and 10 parts of phthalocyanine blue is dispersed into 100 parts of the electron beam curing resin composition (solution) having the same formula as in Example 1 according to the known dispersing procedure to prepare a blue electron beam curing composition having a viscosity of 8 poise at 25° C.

Color glass granules ground to a particle size of about 3 mm are interpersed into the central recessed portion of the aforesaid gypsum substrate, the electron beam curing composition is then coated on the substrate with a hot curtain flow coater at 40° C. to a coating weight of about 100 g/m$^2$ (equivalent to a film thickness of about 100 microns), and the coated substrate is then subjected to irradiation of the accelerated electron beam for curing under an atmosphere of combustion gas. A scanning type electron beam accelerater is used under the conditions of an accelerating voltage of 300 kV, a distance between the irradiation source and the coated surface of 10 cm, and an irradiation dose of 5 MR.

Finished gypsum tile thus obtained has a peculiar decorative pattern as well as a sparkling brilliance due to color glass granules in the central portion to be suitable as a three dimensional designing material for use in a wall surface structure.

EXAMPLE 4

The hydrated gypsum slurry having the same formula as in Example 1 is cast into the same silicone rubber molding pattern as in Example 1 to a thickness of 5 mm, the slurry thus cast is subjected to defoaming by a table vibrator for about 10 seconds, and the surface of the slurry layer is smoothed with a trowel for finishing.

The gypsum slurry is left to stand for setting, is then released, and dried in an electric oven at 60° C. for 12 hours to obtain a gypsum substrate.

The same orange colored electron beam curing composition as in Example 1 is coated on the surface of the aforesaid gypsum substrate by air spraying to a coating weight of about 100 g/m$^2$ (equivalent to a film thickness of about 100 microns) to be subjected to the irradiation of accelerated electron beam under an atmosphere of a combustion gas for curing. A scanning type electron beam accelerater is used under the conditions of an accelerating voltage of 300 kV, an irradiation distance of 10 cm, and an irradiation dose of 5 MR.

Finished gypsum tile thus prepared has a surface with high gloss, beautiful, orange finishing as in Example 1, a surface hardness of 6H, and excellent durability for outdoor use.

In another embodiment, a silicone rubber molding pattern is prepared by use of an Italian tile having no embossed pattern in the same manner as in Example 1. Using the pattern, a gypsum substrate having a flat surface is prepared in the same manner as above. A needled roller prepared by implanting metal needles on the surface of a rubber roller in a regular or random arrangement is rolled on the aforesaid gypsum substrate to form intentionally fine pinholes on the surface of the substrate, and the aforesaid electron beam curing composition is coated for finishing with the result that a peculiar, celamic-like gypsum tile with interspersed pinholes on the coated surface can be obtained.

What is claimed is

1. A process for preparing gypsum panels coated with a resin composition that is cured by electron beam irradiation, said process comprises the steps of:
- (1) adding to a hydrated gypsum slurry formed by adding water to α-type hemihydrate gypsum in an amount of from 28 to 60 parts by weight of water per 100 parts by weight of gypsum
  - (i) an organic additive selected from acrylic copolymer resin emulsion and melamine resin powder in an amount of from 0.1 to 10 parts by weight of solids per 100 parts by weight of the gypsum in the hydrated gypsum slurry,
  - (ii) a granular inorganic additive selected from silica sand, calcium carbonate and marble powder having a particle size of from No. 3 or 20 mesh 80% pass to No. 6 or 100 mesh 75% pass according to JIS G-5901 in an amount of from 20 to 80 parts by weight per 100 parts by weight of the gypsum in the hydrated gypsum slurry, and
  - (iii) an organic or inorganic fibrous material selected from pulp, glass fibers and volcanic ash fibers in an amount of from 0.2 to 3.0 parts by weight per 100 parts by weight of the gypsum in the hydrated gypsum slurry;
- (2) casting the resulting slurry to form a first slurry layer int a flat plated mold or a mold having a pattern embossed thereon, the pattern having a thickness of from 0.4 to 6 mm;
- (3) defoaming said slurry layer with vibration, then setting and drying to form a first gypsum substrate;
- (4) coating on the surface of the gypsum substrate an electron beam curing resin composition consisting essentially of
  - (i) a reaction product between a functional group-containing base resin and a vinyl monomer having a group capable of effecting an addition or condensation reaction with said functional group, the molecule of said reaction product having an ethylenically unsaturated bond of from 0.3 to 3.0 moles/kg of molecule,
  - (ii) a cross-linkable oligomer having a molecular weight less than 1000 and have from 2 to 4 polymerizable vinyl groups in an amount of from 1 to 300 parts by weight per 100 parts by weight of the reaction product, and
  - (iii) at least one of an inorganic pigment, organic pigment and metallic pigment; and thereafter
- (5) exposing the resin coating to accelerated electron beam irradiation thereby curing the resin composition on the surface of the gypsum substrate.

2. The process according to claim 1, which includes the additional step, after the completion of defoaming of the first slurry layer, of casting a hydrated gypsum slurry having a formulation identical to or different from said first slurry onto said first slurry layer to a thickness of from 3 to 20 mm, and subjecting a second slurry layer thus formed to defoaming with vibration followed by setting and drying to form a second gypsum substrate.

3. The process according to claim 1 or 2, wherein after coating the electron beam curing resin composition onto the gypsum substrate, the coated surface is covered with a plastics film for the accelerated electron beam irradition.

4. The process according to claim 1 or 2, wherein the functional group-containing base resin in the electron beam curing resin composition is acrylic resin.

5. The process according to claim 1 or 2, wherein the glass fibers are chopped strand E-glass fibers.

6. A cured gypsum panel produced by the process of claim 1.

7. A cured gypsum panel produced by the process of claim 2.

* * * * *